US012792641B2

(12) United States Patent
Liao et al.

(10) Patent No.: US 12,792,641 B2
(45) Date of Patent: Nov. 10, 2026

(54) ARTIFICIAL INTELLIGENCE BASED SYSTEMS FOR DOCUMENT TRANSFORMATION

(71) Applicant: ZipHQ, Inc., San Francisco, CA (US)

(72) Inventors: Yizheng Liao, San Francisco, CA (US); Chuqian Li, San Francisco, CA (US); Bo Yu, San Francisco, CA (US); James Chen, San Francisco, CA (US)

(73) Assignee: ZipHQ, Inc., San Francisco, CA (US)

( * ) Notice: Subject to any disclaimer, the term of this patent is extended or adjusted under 35 U.S.C. 154(b) by 0 days.

(21) Appl. No.: 19/067,301

(22) Filed: Feb. 28, 2025

(65) Prior Publication Data

US 2026/0259896 A1 Sep. 3, 2026

(51) Int. Cl.
*G06F 16/35* (2025.01)
*G06F 16/332* (2019.01)
*G06F 40/284* (2020.01)

(52) U.S. Cl.
CPC .......... *G06F 16/3323* (2019.01); *G06F 16/35* (2019.01); *G06F 40/284* (2020.01)

(58) Field of Classification Search
None
See application file for complete search history.

(56) References Cited

U.S. PATENT DOCUMENTS

| | | | | |
|---|---|---|---|---|
| 7,657,832 | B1 * | 2/2010 | Lin | G06F 40/143 715/237 |
| 11,314,807 | B2 * | 4/2022 | Hershowitz | G06F 16/1794 |
| 2006/0206523 | A1 * | 9/2006 | Gaurav | G06F 40/221 |
| 2017/0255603 | A1 * | 9/2017 | Kajinaga | G06F 40/137 |
| 2020/0210490 | A1 * | 7/2020 | Hutchins | G06V 30/416 |
| 2022/0086217 | A1 * | 3/2022 | Chen | H03M 7/30 |
| 2024/0160838 | A1 * | 5/2024 | Anoun | G06V 30/416 |

* cited by examiner

*Primary Examiner* — Yu Zhao
(74) *Attorney, Agent, or Firm* — Goodwin Procter LLP

(57) ABSTRACT

Provided herein is an artificial intelligence (AI) system for transforming document data into structured outputs. The system may include a computing device. A computing device may be configured to receive a document. A computing device may be configured to extract document data from the document through a data extraction process. A computing device may be configured to input the document data into an artificial intelligence, wherein the artificial intelligence is trained with training data correlating document data to categories. A computing device may be configured to categorize the document data to a category through the artificial intelligence. A computing device may be configured to process the document data through the artificial intelligence. A computing device may be configured to generate a structured output of document data based on the processing through the artificial intelligence, wherein the structured output at least partially retains a structure of the document.

17 Claims, 7 Drawing Sheets

ARTIFICIAL INTELLIGENCE BASED SYSTEMS FOR DOCUMENT TRANSFORMATION

TECHNICAL FIELD

The present disclosure relates to document processing. In particular, the present disclosure relates to artificial intelligence based system for document transformations and methods of use.

SUMMARY

Provided herein is an artificial intelligence (AI) system for transforming document data into structured outputs. The system may include a computing device. A computing device may be configured to receive a document. A computing device may be configured to extract document data from the document through a data extraction process. A computing device may be configured to input the document data into an artificial intelligence, wherein the artificial intelligence is trained with training data correlating document data to categories. A computing device may be configured to categorize the document data to a category through the artificial intelligence. A computing device may be configured to process the document data through the artificial intelligence, wherein the artificial intelligence selectively processes the data based on the categorization. A computing device may be configured to generate a structured output of document data based on the processing through the artificial intelligence, wherein the structured output at least partially retains a structure of the document.

Provided herein is an artificial intelligence-based computer-implemented method for transforming document data into structured outputs. A method may include receiving a document. A method may include extracting document data from the document through a data extraction process. A method may include inputting the document data into an artificial intelligence, wherein the artificial intelligence is trained with training data correlating document data to categories. A method may include categorizing the document data to a category through the artificial intelligence. A method may include processing the document data through the artificial intelligence, wherein the artificial intelligence selectively processes the data based on the categorization. A method may include generating a structured output of document data based on the processing through the artificial intelligence, wherein the structured output at least partially retains a structure of the document.

Provided herein is a non-transitory computer readable medium containing instructions, that, when executed by a processor, cause the processor to receive a document. A processor may extract document data from the document through a data extraction process. A processor may input the document data into an artificial intelligence, wherein the artificial intelligence is trained with training data correlating document data to categories. A processor may categorize the document data to a category through the artificial intelligence. A processor may process the document data through the artificial intelligence, wherein the artificial intelligence selectively processes the data based on the categorization. A processor may generate a structured output of document data based on the processing through the artificial intelligence, wherein the structured output at least partially retains a structure of the document.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). reference numeral. A brief introduction of the figures is below.

DETAILED DESCRIPTION

Figure 1:
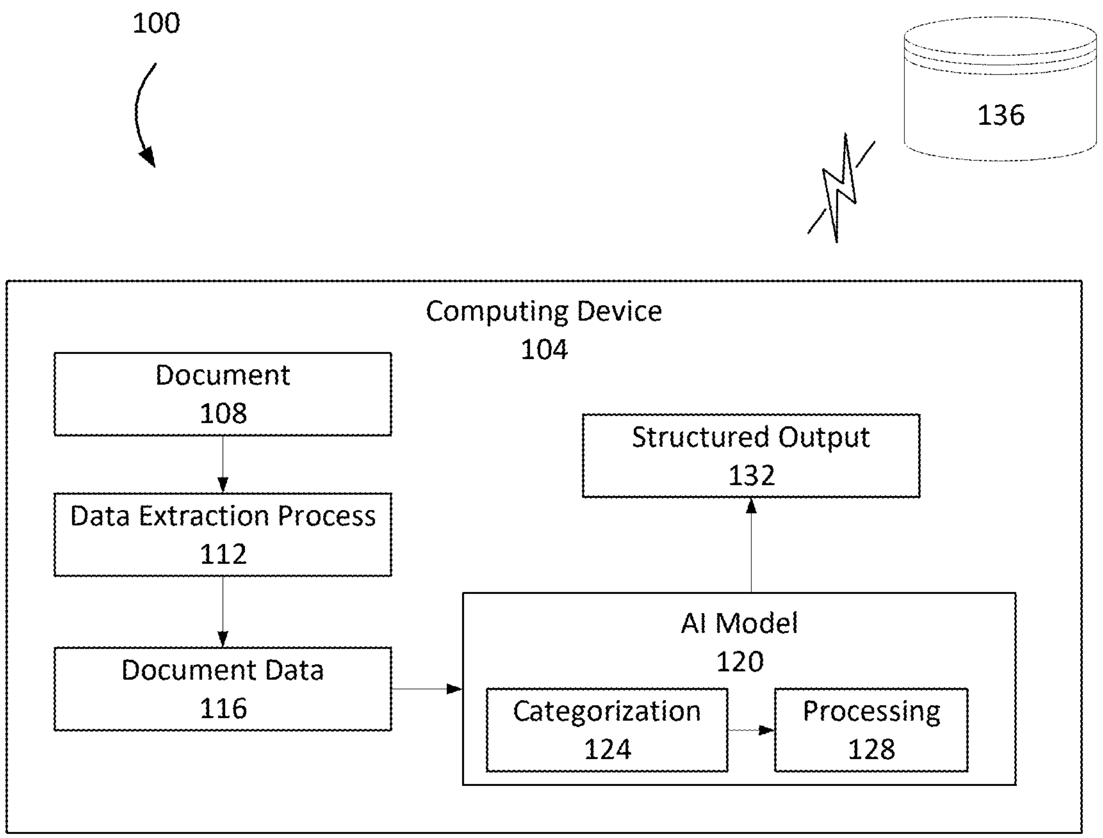
FIG. 1 illustrates a block diagram of a system for transforming documents intro structured outputs.

Reference will now be made in detail to several embodiments, examples of which are illustrated in the accompanying figures. The Figures (Figs.) and the following description relate to preferred embodiments by way of illustration only. It is noted that wherever practicable similar or like reference numbers may be use in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Traditional optical character recognition (OCR) solutions represent an early attempt at automation, but they face two foundational challenges. OCR systems fail to capture the semantic context and relationships between different elements within documents they cannot understand, for example, that a date in one context might represent a shipping date while in another it indicates a contract start date. More critically, OCR only addresses the initial challenge of converting document images into machine readable text. The more complex challenges remain unsolved: accurately extracting key information fields, understanding their functional significance, and matching this information to existing system records. Aspects of the present disclosure provide an artificial intelligence (AI) based system that enables more comprehensive analysis and document processing than current OCR systems. In some embodiments, aspects of the present disclosure provide for a more accurate response of one or more large language models (LLMs). For instance, LLMs may have an input threshold that may prevent them from efficiently processing vast amounts of data. Moreover, even if LLMs are able to process vast amounts of data, the accuracy drops substantially as the amount and complexity of documents being fed to an LLM increase.

Systems and methods described herein may enable LLMs to process more data through the use of output formatting and/or intelligent document classification. For instance, if a data input exceeds a data threshold, classification of the data to specific page types may occur, and relevant pages may be processed, which may optimize downstream processing efficiency.

Systems and methods described herein may provide for more accurate responses generated by one or more LLMs through a self-checking validation process. For instance, despite providing explicit instructions to an LLM, "hallucinations" may still occur, which may render output data unreliable. By implementing a rules-based policy, an LLM may self-check any generated output to ensure the generated output is in compliance with one or more rules.

Systems and methods described herein may allow for an increased amount of data an LLM may be able to process. LLM's may have a token limit, where certain amounts of data may not be able to properly be processed by an LLM if the token limit is exceeded. In an embodiment, AI models described herein may be trained to transform extracted document data into a compact form, which may reduce an amount of tokens generated for the same data compared to an uncompact format. A reduction of an amount of tokens may allow for increase speed and accuracy of an LLM as well as an increased amount of document data that may be processed at a time by the LLM. The above embodiments and others are described further below.

Referring now to FIG. 1, an artificial intelligence based system 100 for transforming documents into structured outputs is presented. An "artificial intelligence" as used in this disclosure is any software capable of performing one or more tasks without human intervention. Artificial intelligences may include one or more data models, such as, but not limited to, classifiers, machine learning (ML) models, large language models (LLMs), generative artificial intelligence (gen AI), or any other type of data model. System 100 may include AI model 120, as described herein.

System 100 may include computing device 104. Computing device 104 may be, but is not limited to, a desktop, laptop, server, smartphone, tablet, or other device. Computing device 104 may include a processor and a memory communicatively connected to the processor. A memory of computing device 104 may include instructions configuring a processor of computing device 104 to perform various tasks. Computing device 104 may be in communication with a display device, such as, but not limited to, monitors, device screens, or other displays. In some embodiments, a computing device 104 may be configured to generate and display a user interface (UI) through a display device that may be in communication with computing device 104. A user may input one or more commands and/or data to computing device 104 through a UI displayed on a display device. For instance, computing device 104 may be a desktop, which may be in communication with a monitor. A user may interact with a UI displayed on a monitor in communication with computing device 104 through one or more input devices, such as, but not limited to, mouses, keyboards, touchscreens, styluses, and/or other input devices. Computing devices are described in more detail below with reference to FIG. 6.

In some embodiments, computing device 104 may be configured to receive document 108. A "document" as used in this disclosure is any data structure conveying a form of information. For instance, document 108 may be, but is not limited to, a PDF, word document, spreadsheet, JPEG, email, or any other type of document. In some embodiments, document 108 may include document data. "Document data" as used in this disclosure refers to information within a data structure of a document. Document data may include, but is not limited to, textual data, photographical data, or other forms of data. Textual data may include one or more characters, symbols, words, strings, fonts, font sizes, numbers, and/or other data. In some embodiments, document 108 may include a structure. A structure of document 108 may organize data of document 108 into one or more portions. For instance, a structure of document 108 may include a header, body paragraph, footer, bullet points, tabular data, formatted content, or other forms of data structures. In some embodiments, a structure of document 108 may include one or more hierarchical relationships. A "hierarchical relationship" as used in this disclosure refers to a format of data based on a ranked system. For instance, a hierarchical relationship of a structure of document 108 may include a header followed by a body paragraph, a column description followed by column data, table structures, or other hierarchical relationships.

Computing device 104 may be configured to extract document data 116 from document 108 through data extraction process 112. A "data extraction process" as used in this disclosure refers to an operation that identifies and/or removes relevant data from a document. Data extraction process 112 may be a text recognition process. For instance, data extraction process 112 may include an optical character recognition (OCR) process. In some embodiments, data extraction process 112 may utilize a text recognition model, which may be trained on training data correlating text in one or more images to textual outputs. Training data may be received from user input, external computing devices, and/or previous iterations of processing. A text recognition model may be trained to input photographic documents, such as, but not limited to, PDFs, JPEGs, or other documents, and may recognize and output textual data identified in the photographic documents. An output of data extraction process 112 may be document data 116. Document data 116 may include one or more characters, symbols, numbers, words, and/or other textual data of one or more documents 108.

Document data 116 may be input into AI model 120. AI model 120 may include, but is not limited to, an LLM, ML model, classifier, unsupervised learning model, supervised learning model, reinforcement learning model, gen AI model, or any other type of model. In some embodiments, AI model 120 may be fed one or more documents 108 directly. AI model 120 may perform data extraction process 112 to extract document data 116. For instance AI model 120 may be or include a text recognition model, which may be trained to recognize textual data of one or more documents 108. In other embodiments, document data 116 may be extracted via data extraction process 112, which may include a separate model or text recognition software from AI model 120.

AI model 120 may be trained to input document data 116 and categorize document data 116 to one or more categories. Training data may be received via user input, external computing devices, and/or previous iterations of processing. AI model 120 may categorize document data 116 through categorization 124 to one or more categories. Categories may include document types, such as, but not limited to, letters, invoices, quotes, order forms, master service agreements, invoices, contracts, and/or other categories of documents. AI model 120 may classify one or more pages of document 108 to one or more categories. AI model 120 may categorize document data 116 based on semantic meaning derived from document data 116. "Semantic meaning" as used in this disclosure refers to an idea and/or message one or more words convey. AI model 120 may be trained to identify and understand semantic meaning from document data 116. In some embodiments, AI model 120 may be trained to categorize document data 116 to one or more categories based on a semantic meaning interpreted from document data 116. In some embodiments, AI model 120 may interpret semantic meaning of document data 116 from a singular word. In other embodiments, AI model 120 may interpret semantic meanings from multiple words, tables, and/or sentences. Semantic meanings may include any message or conveyance of information that may be derived from textual data. As a non-limiting example, document data 116 may include the words "order", "invoice number", "payment due" or other similar phrases, which AI model 120 may interpret document data 116 to relate to an invoice. In some embodiments, AI model 120 may be trained to categorize document data 116 to a category based on a structure of document data 116. For instance, document data 116 may include line order items, tabular data, or other structures that may be commonly found among certain document types, such as invoices, contracts, service agreements, and the like. AI model 120 may be trained to identify structural elements of document data 116 that may relate to document types and may categorize document data 116 to a document type based on the identification of the structural elements. In some embodiments, AI model 120 may utilize a classification system to perform categorization 124, such as described below with reference to FIG. 4, without limitation.

AI model 120 may be trained to perform processing 128 of document data 116. Processing 128 may include identifying and formatting document data 116. Processing 128 may include omitting unnecessary elements such as special characters, extra whitespaces, formatting issues, and the like. Processing 128 may include tokenization of document data 116. "Tokenization" refers to the process of breaking down words and/or sentences into tokens representative of one or more words and/or sentences. Tokens may be single characters, multiple characters, phrases, or other forms of textual data. In some embodiments, processing 128 includes natural language processing (NLP). NLP may be used to tokenize document data 116 and identify connections between two or more tokens, which may enable AI model 120 to derive meaning from one or more tokens. For instance, processing 128 may include performing semantic analysis of document data 116. "Syntactic analysis" as used in this disclosure refers to the process of identifying relationships between words. As a non-limiting example, a relationship may be a subject-verb-object relationship. Syntactic analysis may include constructing a syntax tree that may represent one or more sentence structures. A "syntax tree" as used in this disclosure refers to a tree-like representation of syntactic structures. A syntax tree may be generated by AI model 120 to relate one or more words and/or phrases to one or more other words and/or phrases. AI model 120 may be trained to perform semantic analysis of document data 116. "Semantic analysis" refers to the process of identifying meaning of one or more words and/or phrases. For instance, semantic analysis may include comparing one or more words and/or phrases to one or more other words and/or phrases that may have a determined similarity. Semantic analysis may include word sense disambiguation (WSD), named entity recognition (NER), relationship extraction, contextual meaning recognition, coreference resolution, sentiment and/or intent analysis, knowledge representation, or other forms of semantic analysis. AI model 120 may perform both syntactic and semantic analysis to organize document data 116 and identify meaning conveyed by document data 116. In some embodiments, based on an identified meaning of document data 116, AI model 120 may categorize document data 116 to a document type or other category.

In some embodiments, AI model 120 may perform a selective processing of document data 116. For instance, AI model 120 may perform an independent processing and/or classification of each individual page identified from document data 116. AI model 120 may maintain contextual relationships between document data of a single or multiple page document through performing a page-level analysis of document data 116. In some embodiments, by performing a page-level analysis of document data 116, processing resources of system 100 may be optimized, as irrelevant data may be omitted from processing 128 and/or categorization 124. In some embodiments, AI model 120 may filter content of document data 116. Content may be filtered based on content types that may be identified within one or more documents 108 based on document data 116. AI model 120 may be trained to identify content of document data 116 through synaptic and/or semantic analysis, as described herein. Through filtering content, AI model 120 may select one or more portions of document data 116 that may be identified as relevant for categorization 124 and/or processing 128. In some embodiments, processing 128 ay be based on a categorization 124 of document data 116. For instance, a document type and/or category may be identified through categorization 124. Based on a document type and/or category processing 128 may be performed differently than other identified document types and/or categories.

Processing 128 may include parsing document data 116, in some embodiments. "Parsing" as used in this disclosure refers to a deconstruction of complex data into simpler forms. Parsing may include performing syntactic and/or semantic analysis as described herein. AI model 120 may be trained to parse document data 116 based on syntax, grammar, identified language, document category, or other variables. Processing 128 may include AI model 120 parsing document data 116 to form structured output 132. AI model 120 may be trained to process document data 116 based on a specific category of document data 116 identified through categorization 124. For instance, AI model 120 may be trained to perform processing 128 on a first category of document data 116 differently than on a second category of document data 116. As a non-limiting example, a first category of document data 116 may be an invoice while a second category of document data 116 may be a contract. AI model 120 may be trained with training data correlating different categories of documents 108 to processed outputs. In some embodiments, processing 128 may include compressing a format of document data 116. For instance, document data 116 may be converted into a common separated value (CSV) or other format, omitting field names of document data 116. Document data 116 may be processed into a format according to a pre-defined list and/or structure. For instance, a pre-defined list or structure may allow document data 116 to be compressed according to the pre-defined list or structure while preventing loss of information. In some embodiments, by compressing document data 116 into a compact format, a number of tokens required to process document data 116 may be less than an uncompressed format. A "token" refers to a chunk of text used in language processing operations. For instance, a token may be a single character, multiple words, parts of a sentence, and/or entire sentences. Tokens may be used by AI model 120 to process document data 116 through processing 128.

In some embodiments, a compact format of document data 116 may allow for a reduced token error rate of AI model 120 of about 50% or greater to about 90% or greater. A token error rate may be a failure of an LLM to process one or more tokens exceeding a threshold amount of tokens.

In some embodiments, document data 116 may be compared to a data threshold. A "data threshold" as used in this disclosure refers to a size limit on an amount of data that can be processed by a software. A data threshold may be set by a user. In some embodiments, a data threshold may be set by computing device 104 such as through AI model 120. A data threshold may be about, but is not limited to, about 2,000 tokens to about 5,000 tokens, less than about 2,000 tokens, or greater than about 5,000 tokens. If document data 116 exceeds a data threshold, computing device 104 may be configured to communicate document data 116 to AI model 120 for selective processing. In some embodiments, if document data 116 meets or is below a data threshold, document data 116 may be processed normally through AI model 120.

For more complex and/or vast amounts of documents 108 that exceed a data threshold, AI model 120 may be trained to selectively process document data 116. Selective processing may include identifying specific page types for processing 128. Identification of specific page types may occur through categorization 124 or as a separate step. For instance, categorization 124 may occur on a per-page level of document data 116. A per-page level categorization of document data 116 may allow for AI model 120 to identify relevant document data 116 on each page of a multi-page document 108. In some embodiments, categorization 124 includes grouping two or more categories of data of document data 116 in addition or alternatively to categorizing document data 116 as a whole. Categories of document data 116 may include, but are not limited to, letter headers, signatures, mailing address, textual field entries, and/or other categories. Textual field entries may include text fields designated for specific data entry. For instance, textual fields may include order form header fields, order form line item fields, and/or other categories. Order form header fields may include, but are not limited to, contract start dates, contract end dates, total amounts, currencies, payment terms, billing frequency, and/or other fields. Order form line item fields may include, but are not limited to, description, quantity, unit price, total price, start date, end date, or other fields. Processing 128 may include parsing document data 116 based on identified categories of document data 116 through categorization 124. For instance, AI model 120 may process one or more textual fields of document data 116.

Still referring to FIG. 1, AI model 120 may be trained to generate structured output 132. A "structured output" as used in this disclosure refers to an output of data having a format. For instance, structured output 132 may be a textual output and/or pictorial output. A textual output may have a format including headers, body text, footers, sub headers, line items, or other formats. In some embodiments, a format of structured output 132 may include spacing between words and/or sentences, paragraph indentation, line spacing, tabs, bold text, italic text, underlined text, and/or other textual formatting. In some embodiments, structured output 132 may at least partially retain a structure of document 108. For instance, document 108 may include one or more headers, sub headers, body text, footers, tabs, line spacing, paragraph idents, or other textual formatting. AI model 120 may be trained to generate structured output 132 to include textual formats originally found in document 108, such as, but not limited to, headers, sub headers, body text, footers, tabs, line spacing, paragraph idents, or other textual formatting. In some embodiments, structured output 132 may be formatted in Markdown format.

AI model 120 may be trained to generate structured output 132 while maintaining one or more structural elements of one or more documents 108. Structured elements may include, but are not limited to, table layouts and alignments, hierarchical relationships between content elements, text formatting and emphasis, special relationships between document components, identification of table boundaries and relationships, cell-formatting within tables, list structures and indentation levels, text emphasis and formatting cues, and/or other structured elements. One or more structural elements of structured output 132 may aid in optimizing processing by AI model 120 or subsequent AI/ML models by retaining meaning between text data elements of one or more documents 108.

Computing device 104 may be in communication with database 136. Database 136 may be any type of database, without limitation. Computing device 104 may be in wired and/or wireless communication with database 136. In some embodiments, structured output 132 may be communicated to database 136 from computing device 104. In some embodiments, database 136 may store one or more reference documents that may be used for AI model 120 in categorization 124. For instance, database 136 may store one or more labeled documents assigned a category. In some embodiments, database 136 may store entity data. Entity data may include data identifying one or more entities, such as, but not limited to, names, addresses, unique codes, or other data. For instance, a first entity may have a corresponding unique code that may be unique to a unique code of a second entity. In some embodiments, database 136 may store training data that may be used by AI model 120.

Figure 2:
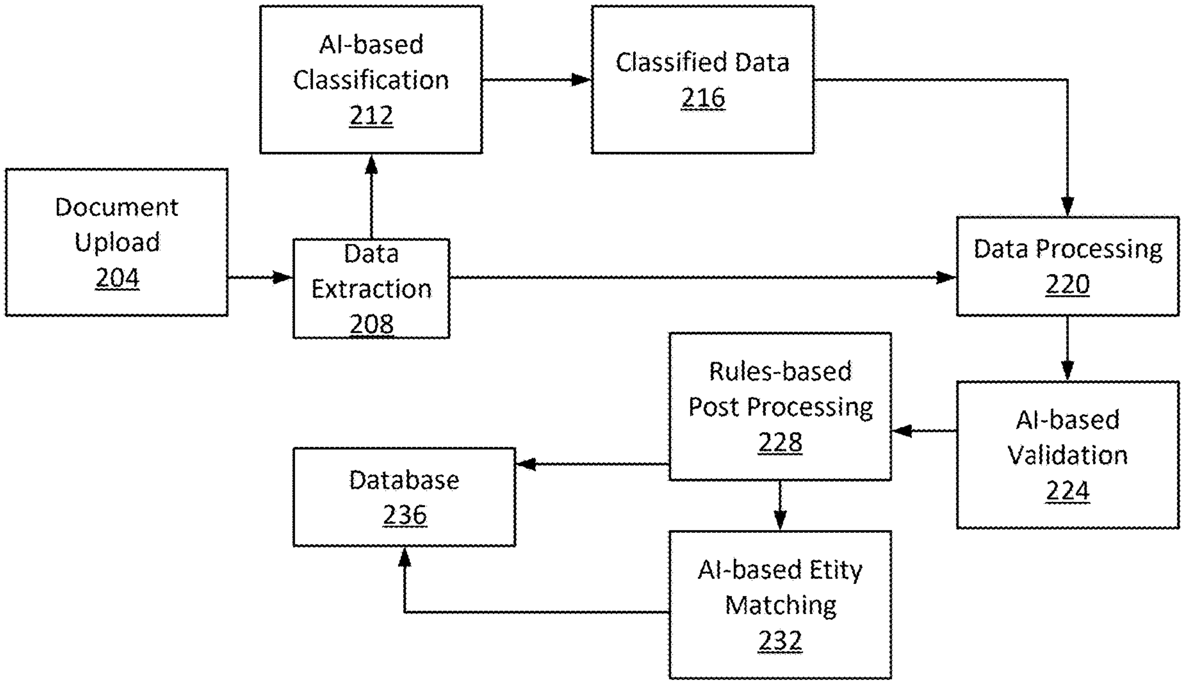
FIG. 2 illustrates another embodiment of a system for transforming documents into structured outputs.

Referring now to FIG. 2, a flowchart of an embodiment of an artificial intelligence based process 200 for transforming documents into structured outputs is presented. At step 204, process 200 includes uploading a document. In some embodiments, a document may be uploaded to a server which may be in communication with a computing device operating process 200. In other embodiments, a document may be input directly to a computing device operating process 200. A document may be any type of document, such as, but not limited to, a word document, spreadsheet, PDF, JPEG, or other type of document. A document may be single page or may be multiple pages. In some embodiments, a plurality of documents may be uploaded simultaneously. Each document of a plurality of documents may be of a same document type. In other embodiments, each document of a plurality of documents may have at least two differing document types. Each document of a plurality of documents may be about equal in length. In some embodiments, each document of a plurality of documents may be differing in length. As a non-limiting example, a plurality of documents may include order forms, master service agreements, invoices, compliancy documents, and/or other types of documents that may all be different page lengths.

At step 208, data extraction is performed. Data extraction may be performed on a single document at a time. In other embodiments, data extraction may be performed on multiple documents simultaneously. Data extraction may include performing a form of text recognition. Text recognition may include utilizing an LLM, text recognition ML model, OCR process, or a combination thereof. In some embodiments, data extraction may include identifying characters, symbols, words, sentences, and the like of one or more documents. Data extraction at step 208 may output various amounts of document data.

At step 212, AI-based classification is performed. Classification may be performed through use of an AI model. An AI model may be an LLM, gen AI, classifier, or any other type of AI/ML model described herein. An AI model may be trained to classify document data to one or more document categories. In some embodiments, data may be categorized by content and/or document type. Document content types may include, but are not limited to, letters, emails, invoices, master service agreements, order forms, or other types of documents. In some embodiments, an AI model may classify document data based on content. Based on one or more words, phrases, paragraphs, characters, and/or symbols, an AI model may classify one or more parts of document data to a content category. Content categories may include, but are not limited to, order form headers, order form line items, and/or other content categories. In some embodiments, a first part of a document may be classified to a first category, while subsequent parts of a document may be classified to one or more other distinct categories. In some embodiments, classified data may include one or more categories of data. For instance, categories of data may include, but are not limited to, headers, body paragraphs, footers, titles, tables, and/or other forms of data. Classifying data may include filtering out data deemed irrelevant, which may allow for a more optimized processing of document data. An AI model may be trained to identify irrelevant data such as extra white spaces, special symbols, or other data that may be deemed irrelevant.

In some embodiments, classification at step 212 may be performed in response to an amount of document data generated by data extraction at step 208 exceeding a data threshold. A data threshold may be a token threshold amount. In other embodiments, a data threshold may be a byte size limit. For instance, a data threshold may be about 10 megabytes (MB), greater than about 10 megabytes, or less than about 10 megabytes. If an amount of document data generated at step 208 exceeds a data threshold, documents may be sent to an AI model at step 212 for classification.

At step 216, classified data is generated. Classified data may be generated from an AI model, such as at step 212. Classified data may include a classification of one or more parts of one or more documents to specific page types. For instance, specific page types may include, but are not limited to, order forms, master service agreements, or other page types. In some embodiments, classified data may be categorized to one or more content types. As a non-limiting example, classified data may be categorized to order form header fields and/or line item fields. In some embodiments, data may be classified by subcategories of content. Subcategories of content may include categories of content identified within a category of content. For instance, subcategories of content may include, but are not limited to, dates, items of value, value amounts, quantities, descriptions of items, entity addresses, entity names, or other forms of content.

At step 220, document data is processed. Document data may be processed by an AI model, in some embodiments. Processing may include syntactic and/or semantic analysis. In some embodiments, data processing may include parsing document data. Data processing may be performed in parallel to classification at step 212. For instance, documents may be uploaded that may exceed a data threshold, which may cause the documents to be sent to an AI model for classification at step 212. Documents may additionally or alternatively be within a data threshold limit and may be sent directly to step 220 for data processing. Data processing at step 220 may include processing two or more categories of data simultaneously. For instance classified data 216 may include document data categorized to one or more content categories. As a non-limiting example, document data may be classified to order form header fields and order form line item fields. Continuing this non-limiting example, both order form header fields and order form line items fields may be processed simultaneously or sequentially at step 220.

At step 224, AI-based validation is performed. Validation may include comparing an output of data processing 220 to one or more criteria. Criteria may include, but is not limited to, formatting, numerical ranges, or other criteria. Criteria may be set by a user. In some embodiments, an AI model may generate and/or update criteria based on iterations of processing and/or user feedback. In some embodiments, an AI model may be an LLM. In embodiments where an AI model is an LLM, a prompt may be given to the LLM which may cause the LLM to perform one or more sanity checks. For instance, a prompt may instruct an LLM to format specific information in a certain way, compare an output of a number of fields with an expected field list, and/or instruct the LLM to correct any hallucinations. In some embodiments, if an output from step 220 is incorrect and/or undesirable, a feedback prompt may be fed to the AI which may cause the AI to reformat and/or recalculate an output generated at step 220.

At step 228, rules-based post processing occurs. A post processing operation may include finalizing output generated by an AI model. For instance, one or more rules may be incorporated into a post processing operation. Rules may be input into an AI model, which may cause the AI model to modify its output based on the rules. An AI model may compare its output with one or more rules in a post processing operation. In some embodiments, a rule may be specific to a type of document data found within one or more documents. For instance, a rule may instruct an AI to check that every document of a specific type has at least one form of data belonging to a data category. As a non-limiting example, a rule may be that every order form must have at least one line item. In some embodiments, a rule may be that certain data fields cannot be empty, for instance, and without limitation, address fields, item description fields, line item fields, or the like. A rule may be that that mathematical relationships between fields must be consistent. In some embodiments, if any rule is broken, an AI may correct an output by comparing erroneous output to reference data. Reference data may be other data found within document data. As a non-limiting example, if an AI model identifies a quantity and unit price, it may be able to verify or correct a total amount of an order form.

Rules-based processing may include context-aware processing. For instance, an AI model may be configured to determine a context of document data processed at step 220. Different types of documents may have corresponding interpretation rules for an AI to follow based on a context associated with the different types of documents. For instance, and without limitation, a type of document may be a physical goods purchase, which may not have a contract end date and a default payment frequence may be on time. Interpretation rules may include a rule that a shipping date of a physical goods purchase may be used as a contract start date, a rule that an end date in an invoice may refer to a due date instead of a contract end date, and/or a rule that an end date in a quotation may refer to an end date of quote validation, not a contract end date. In some embodiments, a document type may be an order form which may be about events. In embodiments where a document type may be an order form which may be about events, an event start and end date may be a contract start and end date. In some embodiments, a prompt given to an AI model may include a chain of through reasoning prompt. A "chain of thought reasoning prompt" prompt as used in this disclosure refers to a textual input given to an AI model that encourage the progression of the AI model's own cognition. As a non-limiting example, a chain of thought reasoning prompt may include "the number of columns is incorrect in your response. Please return the response in the format with all the fields requested."

At step 232, AI-based entity matching is performed. An "entity" as used in this disclosure refers to an individual or organization. An entity may be a company, in some embodiments. An AI model may be trained to match an output generated at step 220 and/or 224 to an entity. Entity data may be stored in a database and may be used by an AI to identify and/or match an entity to any data output described herein. An AI model may be trained to identify information corresponding to an identity of an entity from document data and/or document output. In some embodiments, an AI may extract entity information and input the entity information into a matching process. A matching process may include one or more systems designed to match identifying information to an entity. For instance, a matching process may identify one or more keywords and/or phrases and may search the one or more keywords or phrases within a database to find similar or exact matches. In some embodiments, a matching process may utilize a BM25 algorithm. A matching process may include an embedding-based search. For instance, an entity name and/or address may be converted into text embedding vectors. Text embedding vectors may be used to perform a similarity search to data of a database. A similarity search may include a cosine similarity search. In some embodiments, a matching process may utilize a Levenstein distance search. For instance, a Levenstein distance may be used to measure a similarity of a parsed entity name and one or more entity records within a database. In some embodiments, a matching process includes a combination of all searching and/or matching processes described herein. For instance, a matching process may include a keyword based search, an embedding-based search, and/or a Levenstein distance search.

In some embodiments, a matching process may output one or more results. Results may be ranked through a ranking process. A ranking process may include a ranking function, in some embodiments. Ranking functions may include, but are not limited to, Boolean ranking functions, term frequency (TF) ranking, inverse document frequency (IDF) ranking, probabilistic ranking, or a combination thereof. In some embodiments, a ranking process may be applied to each matching process described herein, such as, but not limited to, keyword based searches, embedding-based searches, Levenstein distance searches, or other searches. A top K results may be selected from each form of matching process and may be fused together using a fusion algorithm. A fusion algorithm may combine one or more ranked outputs of one or more matching systems. In some embodiments, a fusion algorithm may utilize equation 1 below:

$$Y_i = \sum_j \frac{1}{C + \text{Rank}_j(i)} \quad \text{Equation 1}$$

Where "i" is the "ith" entity, j is the "jth" search algorithm, $\text{rank}_j(i)$ is a ranking position of the ith entity in the jth search algorithm, C is a constant, and $Y_i$ is a final fusion score. A matched entity may be an entity with a largest fusion score. In some embodiments, a fusion algorithm, such as detailed above with reference to Equation 1 without limitation, may allow for a rewarding of entities that may rank well across multiple classification methods while reducing an impact of any single methods error. For instance and without limitation, one matching process may find no matching entity, which may be accounted for in a fusion algorithm. In some embodiments, a confidence score may be provided by a fusion algorithm for each matching entity. A "confidence score" as used in this disclosure refers to a numerical value representing a trust in an output. Confidence scores may be represented from 0 to 1, as a percent value, or other representations. In some embodiments, a fusion algorithm may provide an overall confidence score. In other embodiments, a confidence score may be calculated for each individual matching process output of a fusion algorithm.

In some embodiments, entity matching may be performed through context awareness formulated by an AI model. For instance, an AI model may identify a context of one or more documents and may correlate the context to entity data that may have a similar context. For instance, if a first entity regularly provides a first type of document having a structure, an AI model may identify the first type of document and the structure and may correlate the first type of document to a first entity. In some embodiments, an AI model may be trained to identify semantic meaning of document data and map the document data to an entity based on the semantic meaning. As a non-limiting example, if document data relating to an order for a specific type of dog food is identified, an AI model may map the document data to an entity that regularly provides documents relating to the specific type of dog food. Entities may be matched to categories and/or subcategories. Categories of entities may include, but are not limited to, individuals, organizations, retail stores, construction companies, and/or other types of entities. A subcategory of entity may include, but is not limited to, electronics store, retail store, logistics company, plumbing company, and/or any other types of categories of entities. In some embodiments, matching processes described herein may allow for subsidiary matching. A "subsidiary" as used in this disclosure refers to an organization owned by an entity. In some embodiments, a prompt may be given to an AI model that may provide one or more instructions for the AI model to identify a context and an entity matching the identified context. For instance, instructions that may be given via a prompt for an AI model may include deciding if the AI model has seen an entity before, deciding what category and/or subcategory the entity may be part of, and/or other instructions.

At step 236, output from steps 228 and/or 232 are entered into a database. A database may be continually updated through process 200. A database may be used for future iterations of process 200.

Figure 3:
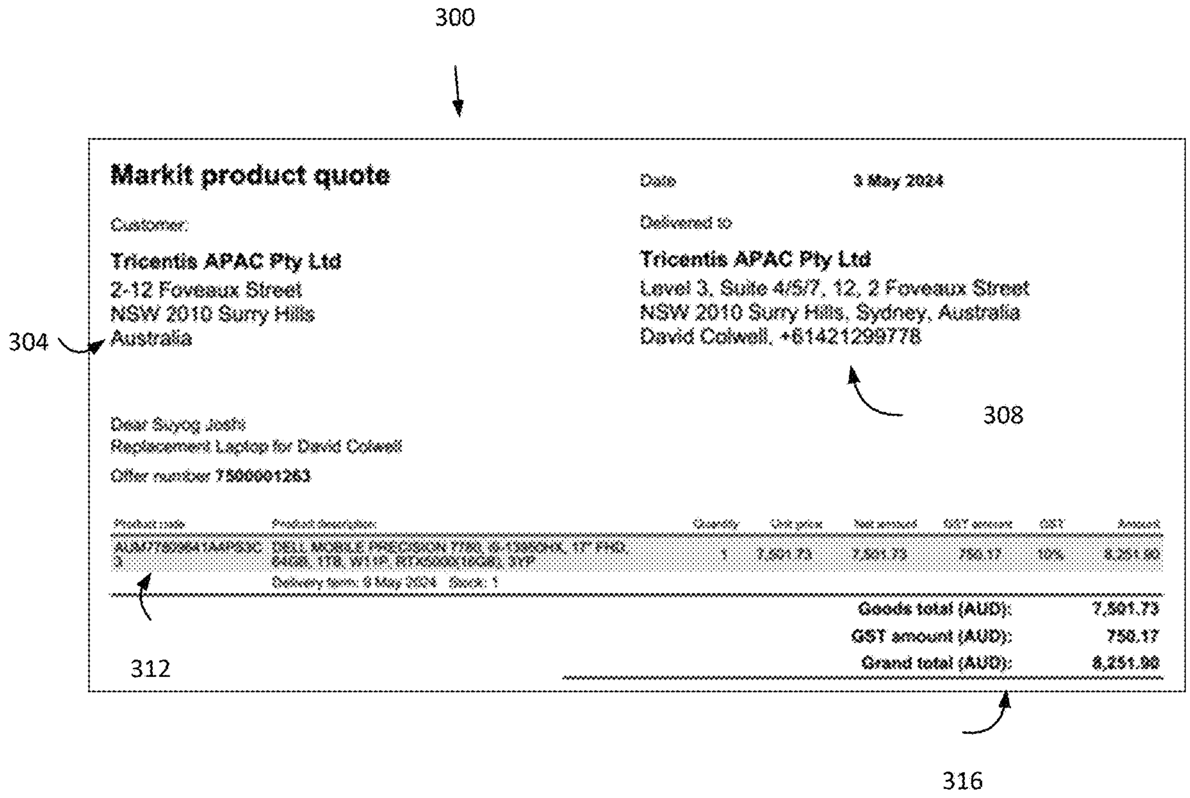
FIG. 3 illustrates an example of a document.

Referring now to FIG. 3, an illustration of a document 300 that may be transformed into a structured output using systems and methods described herein is presented. Although shown as a quote in FIG. 3, document 300 may be any type of document, without limitation. Document 300 may include entity information 304. Entity information 304 may include, but is not limited to, individual names, company names, addresses, and/or any other identifying information. For instance in some embodiments, entity information 304 may include an entity code that may be a unique code associated with a specific entity. Document 300 may include delivery information 308. Delivery information 308 may include a city, town, state, zip code, country, street, and/or any other forms of address. In some embodiments, delivery information 308 may include entity contact information, such as, but not limited to, telephone numbers, emails, fax numbers, or other contact information. Document 300 may include line item 312. In some embodiments, line item 312 may include text across a horizontal axis of document 300 with one or more descriptions of each part of text appearing above each part of text. For instance, line item 312 may include a product code, product description, quantity, unit price, net amount, GST amount, GST percentage, and total amount. In some embodiments, document 300 may include value total 316. Value total 316 may represent a numerical value of one or more items and/or labor efforts. Document 300 may have a structure. For instance, a top left corner of document 300 may recite a title of document 300 and may be in a pseudo-bullet point format in which each line represents a new category of information. A top center-right corner of document 300 may recite delivery information 308 and may be in a pseudo-bullet point format. Line item 312 may be positioned below both entity information 304 and delivery information 308 and may expand horizontally across a length of document 300. In some embodiments, line item 312 may be shaded or otherwise color coded. For instance, text in a shaded region of line item 312 may represent crucial information of document 300. In some embodiments, document 300 may have various line spacings, fonts, font sizes, font characteristics, special characters, or other features. Document 300 may have a solid line on a top of line item 312 and on a bottom of line item 312. Document 300 may have a solid line on a bottom of value total 316.

By using systems and methods described herein, document 300 may be transformed into a structured output with relevant document data at least partially retaining an original structure of document 300. For instance, a structured output generated from document 300 may retain the font size difference between the title of document 300 and entity information 308, the bold text of the title of document 300, the pseudo-bullet list format of entity information 304 and delivery information 308, and/or the positioning of line item 312 below both entity information 304 and delivery information 308. A structured data output generated from document 300 may enable more efficient and accurate processing of data conveyed by document 300 through AI models and systems as described herein.

Figure 4:
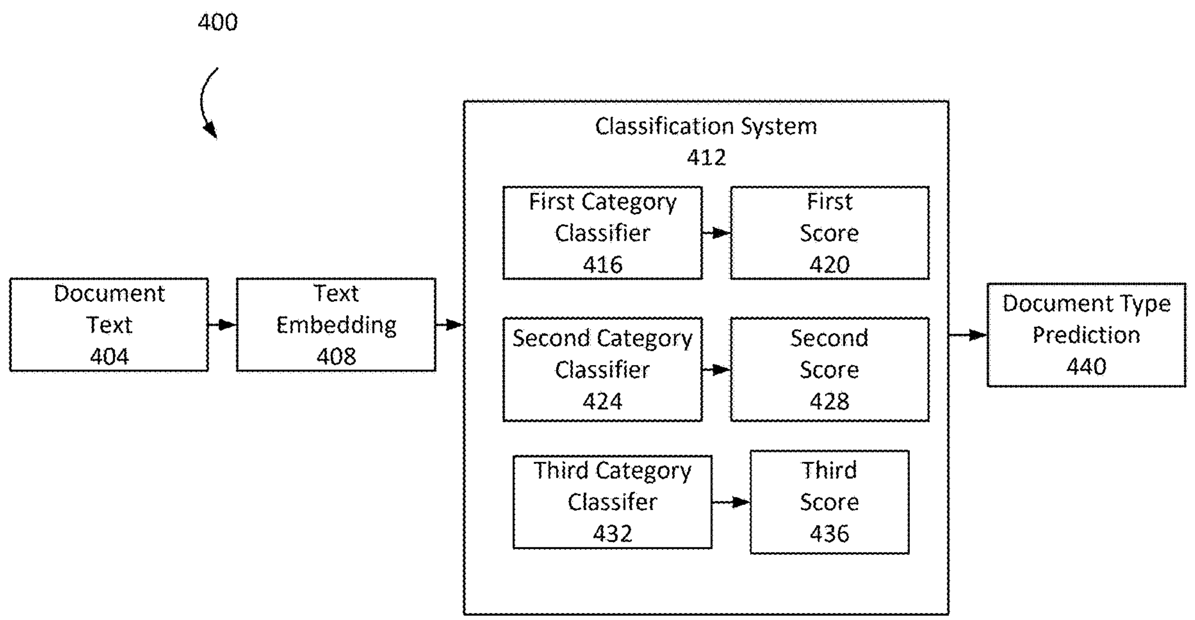
FIG. 4 illustrates a system for document classification.

Referring now to FIG. 4, a system 400 for classification of documents is presented. System 400 may utilize an AI model, such as AI model 120 as described above with reference to FIG. 1, without limitation.

System 400 may include document text 404. Document text 404 may be received from a user and/or computing device. Document text 404 may be extracted using any extraction process described herein, without limitation. In some embodiments, document text 404 may be converted into one or more vectors through text embedding 408. Document text 404 may be embedded into a vector, such as an embedding vector. An "embedding vector" or "embedding" as used in this disclosure refers to a vector created as a numerical representation of non-numerical data and/or data objects. In some embodiments, an AI or ML model may embed document text 404 text into one or more vectors via text embedding 408. For instance, and without limitation, text embedding 408 may include the use of a natural language processing (NLP) model. Text embedding 408 may include tokenization of one or more words and/or sub words. Each token that may be created from document text 404 may be converted into a vector representation. In some embodiments, vectors generated through text embedding 408 may be aggregated.

System 400 may include classification system 412. Classification system 412 may include one or more AI and/or ML models. For instance, classification system 412 may include first category classifier 416, second category classifier 424, and/or third category classifier 432. In some embodiments, classification system 412 may include a single classifier. Each classifier of classifier 416, 424, and 432 may be trained to categorize specific documents and/or document data. First category classifier 416 may be trained with training data correlating documents to a first document category. Second category classifier 424 may be trained with training data correlating documents to a second document category. Third category classifier 432 may be trained with training data correlating documents to a third document category. Training data may be received via user input, external computing devices, and/or previous iterations of processing. In some embodiments, each of classifiers 416, 424, and 432 may be a same classifier type. In other embodiments, at least one of classifiers 416, 424, and 432 may be a different classifier type than a remaining two. Classifier types may include, but are not limited to, perceptron, logistic regression, Naïve Bayes, K-Nearest neighbors, Support Vector Machine, Random Forest, or other forms of classifiers.

In some embodiments, first category classifier 416 may receive one or more vectors from text embedding 408. First category classifier 416 may be trained and/or configured to input one or more vectors and output first score 420. First score 420 may be a prediction that one or more vectors belong to a first category. Second category classifier 424 may receive one or more vectors that may be the same as vectors received by first category classifier 416. In other embodiments, vectors received by second category classifier 424 are different than those that may be received by first category classifier 416. Second category classifier 424 may be trained and/or configured to generate second score 428. Second score 428 may be a prediction that one or more vectors belong to a second document category. In some embodiments, third category classifier 432 may receive one or more vectors form text embedding 408. One or more vectors received by third category classifier 432 may be the same or different than one or more vectors received by first category classifier 416 and/or second category classifier 424. Third category classifier 432 may be trained and/or configured to generated third score 436. Third score 436 may be a prediction that one or more vectors belong to a third document category. As a non-limiting example, a first document category may be an order form, a second document category may be a master service agreement, and a third type of category may be a compliance document.

Classification system 412 may be configured to combine first score 420, second score 428, and/or third score 436 to form document type prediction 440. Document type prediction 440 may be an overall heuristic that document text 404 belongs to a specific document category. In some embodiments, first score 420, second score 428, and/or third score 436 may be weighted, which may effect an overall document type prediction 440. A "weight" as used in this disclosure refers to a numerical value representative of an overall importance. A weight may be about 0 to 1, with 0 being the least important and 1 being the most important. Classification system 412 may be tuned to apply any weight to any of first score 4420, second score 428, and/or third score 436, without limitation.

In some embodiments, classification system 412 may utilize a binary classification architecture. A "binary classification architecture" as used in this disclosure refers to a process of categorizing an object in a Boolean manner. For instance, any of classifiers 416, 424, and/or 432 may be binary classifiers. Classification system 412 may implement a reference pool architecture. A "reference pool architecture" as used in this discourse refers to a process of classification using one or more reference documents. Classification system 412 may include a reference pool of two or more labeled documents. In some embodiments, a reference pool may have about 200 or greater labeled documents. A reference pool may have a plurality of labeled documents belonging to two or more document categories. In some embodiments classification system 412 may continuously updated a reference pool with labeled documents, which may improve document type prediction 440 accuracy. Classification system 412 may utilize a top-K similarity matching process. For instance, classification system 412 may utilize Equation 2.

$$\text{prediction score } Y_i = \frac{\#\text{ of documents that are type } i \text{ in top } K}{K} \quad \text{Equation 2}$$

Where $Y_i$ represents a prediction score for document type "i" and "K" is a number of top similar documents retrieved. A prediction score may be based on a number of documents that are a certain type "i", in a top "K" number of documents. A prediction score may be calculated by classification system 412 using Equation 2. A maximum likelihood classification may be performed using Equation 3.

$$\text{document type}=\text{argmax}_{i\in\{order\ form, MSA, SOC2\}} Y_i \quad \text{Equation 3}$$

Where an argmax function may be used to determine a likelihood a document should be classified to a specific document type. An "argmax function" as used in this disclosure refers to a process of finding an input value that outputs a maximum value from a target function.

Example Data

TABLE 1

| System Aspect | Key metrics impact |
|---|---|
| LLM output compression though optimized data formatting | Overall cost: −90%<br>Overall latency: −90% |
| Context-aware entity matching | Entity matching rate: 80%<br>Subsidiary matching rate: 90% |

Referring now to table 1, various metrics of a performance of an AI model are presented. In particular, LLM output compression through optimized data formatting was measured. An overall cost was reduced by 90% compared to an LLM processing data without compression. An overall latency of the LLM was reduced by about 90% compared to an LLM processing data without compression.

For context aware entity matching, AI models using systems and methods described herein achieved a matching rate of about 80%. For subsidiary matching, AI models using systems and methods described herein achieved a matching rate of about 90%.

Methods

Figure 5:
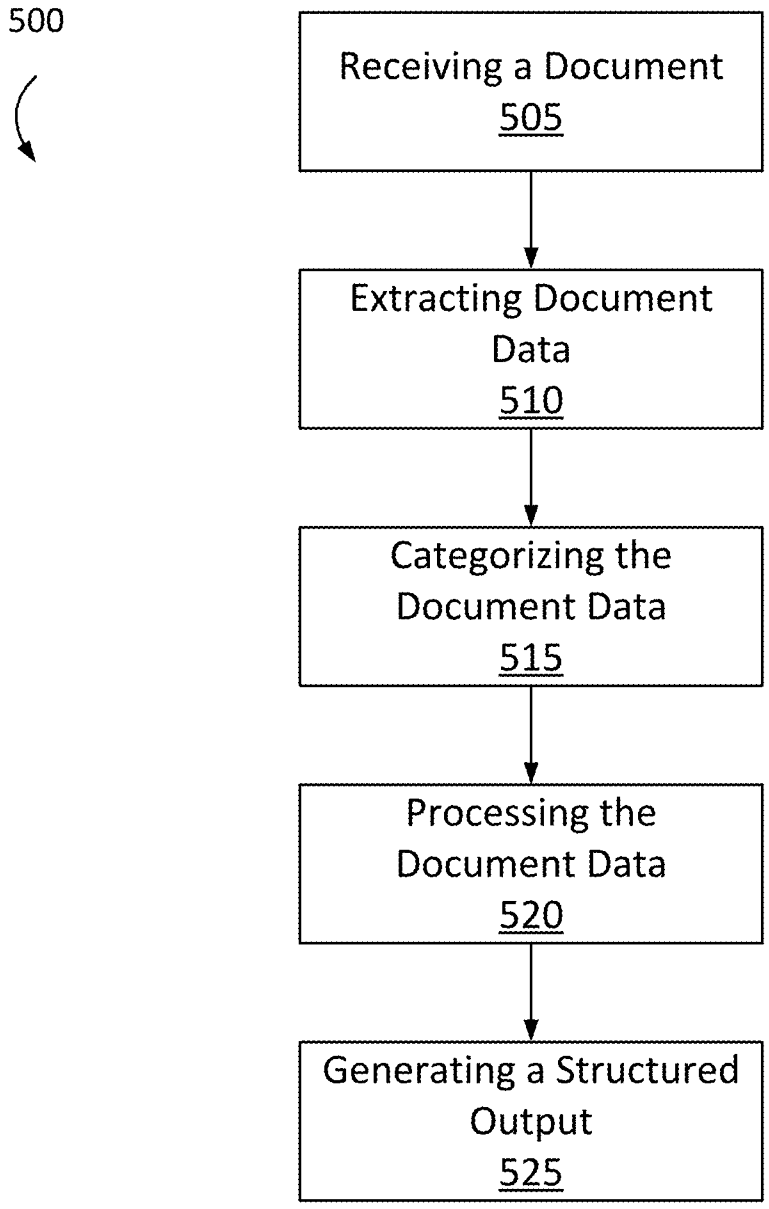
FIG. 5 illustrates a flowchart of a method for transforming documents intro structured outputs.

Referring now to FIG. 5, a flowchart 500 of a method of transforming document data into structured outputs is presented. At step 505, a document may be received. A document may be received from user input and/or an external computing device. A document may be any type of document described herein, without limitation.

At step 510, document data may be extracted. Document data may include text, pictures, tables, and/or other forms of document data. Document data may be extracted through an LLM, OCR process, or any other extraction process described herein. Text may be extracted from word files, tables, photographs, PDFs, spreadsheets, and/or other forms of documents. Document data may include text, tabular data, and/or other forms of data.

At step 515, document data may be categorized. Document data may be categorized by an AI model. Document data may be categorized to a category such as a document type, in some embodiments. In some embodiments, document data may be categorized through one or more classifiers. Document types and/or categories may include, but are not limited to, invoices, letters, quotes, service agreements, contracts, and/or any other type of document.

At step 520, document data may be processed. Document data may be processed by an AI model in some embodiments. Processing document data may include performing syntactic and/or semantic analysis on the document data. In some embodiments, processing document data may include parsing document data.

At step 525, a structured output may be generated. A structured output may be generated by an AI model. A structured output may be generated using any process described herein. A structure output may include text in some embodiments. A structured output may at least partially retain a structure of an original document.

Any of the steps of method 500 may be implemented as described above with reference to FIGS. 1-4, without limitation.

Figure 6:
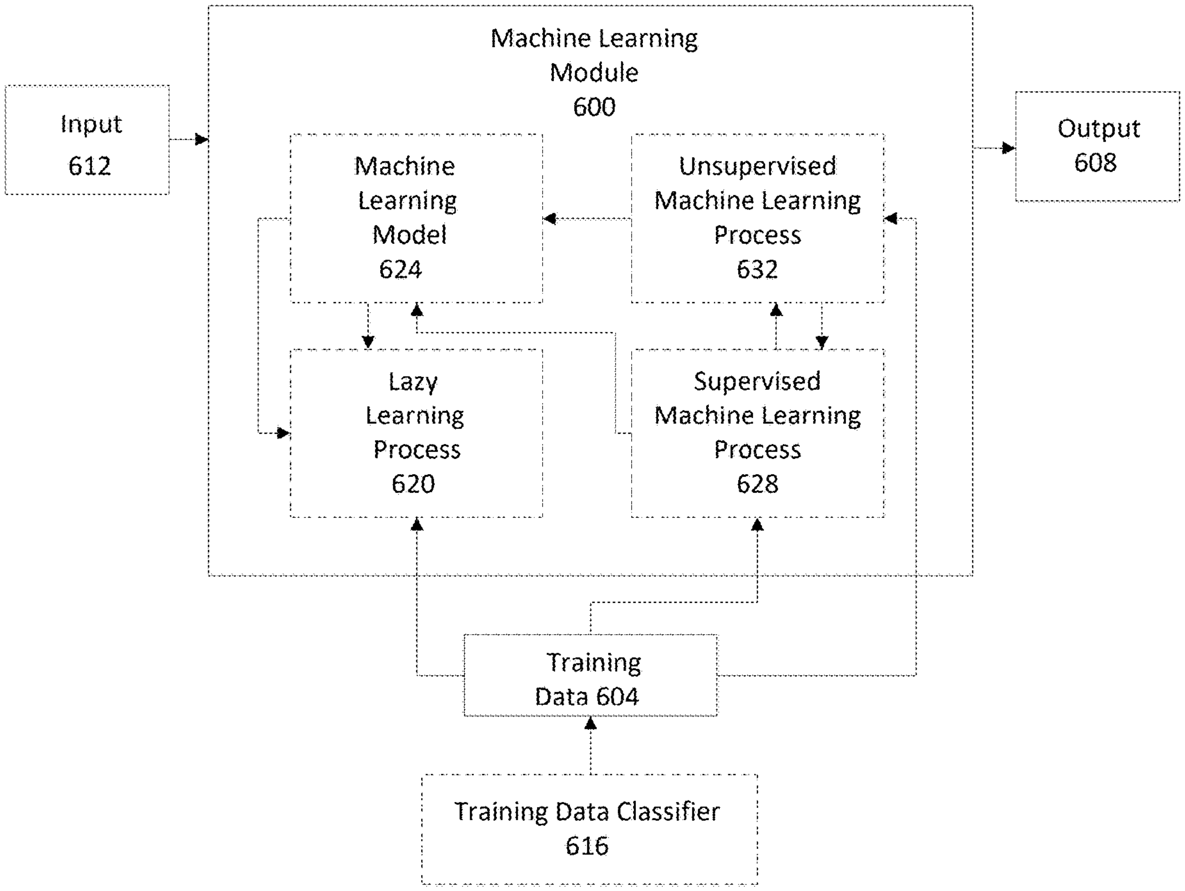
FIG. 6 illustrates a machine learning module that may be used with systems and methods described herein.

Referring to FIG. 6, an exemplary machine learning module 600 may perform machine learning process(es) and may be configured to perform various determinations, calculations, processes and the like as described herein using one or more machine learning processes.

Machine learning module 600 may utilize training data 604. For instance, and without limitation, training data 604 may include a plurality of data entries, each entry representing a set of data elements that were recorded, received, and/or generated together. Training data 604 may include data elements that may be correlated by shared existence in a given data entry, by proximity in a given data entry, or the like. Multiple data entries in training data 604 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations. Correlations may indicate causative and/or predictive links between categories of data elements, which may be modeled as relationships such as mathematical relationships by machine learning processes as described in further detail below. Training data 604 may be formatted and/or organized by categories of data elements. Training data 604 may, for instance, be organized by associating data elements with one or more descriptors corresponding to categories of data elements. As a non-limiting example, training data 604 may include data entered in standardized forms by one or more individuals, such that entry of a given data element in a given field in a form may be mapped to one or more descriptors of categories. Elements in training data 604 may be linked to descriptors of categories by tags, tokens, or other data elements. Training data 604 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 6, training data 604 may include one or more elements that are not categorized. Uncategorized data of training data 604 may include data that may not be formatted or containing descriptors for some elements of data. In some embodiments, machine learning algorithms and/or other processes may sort training data 604 according to one or more categorizations. Machine learning algorithms may sort training data 604 using, for instance, natural language processing algorithms, tokenization, detection of correlated values in raw data and the like. In some embodiments, categories of training data 604 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine learning algorithms, and/or automated association of data in the data entry with descriptors or into a given format. The ability to categorize data entries in an automated fashion may enable the same training data 604 to be made applicable for two or more distinct machine learning algorithms as described in further detail below. Training data 604 used by machine learning module 600 may correlate any input data as described in this disclosure to any output data as described in this disclosure, without limitation.

Further referring to FIG. 6, training data 604 may be filtered, sorted, and/or selected using one or more supervised and/or unsupervised machine learning processes and/or models as described in further detail below. In some embodiments, training data 604 may be classified using training data classifier 616. Training data classifier 616 may include a classifier. A "classifier" as used in this disclosure is a machine learning model that sorts inputs into one or more categories. Training data classifier 616 may utilize a mathematical model, an artificial neural network, or a program generated by a machine learning algorithm. A machine learning algorithm of training data classifier 616 may include a classification algorithm. A "classification algorithm" as used herein is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine learning module 600 may generate a classifier, such as training data classifier 616 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to one or more parameters of a gen AI responses and/or response templates.

Still referring to FIG. 6, machine learning module 600 may be configured to perform a lazy-learning process 620 which may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like. Persons skilled in the art, upon reviewing the entirety of this disclosure, will be aware of various lazy-learning algorithms that may be applied to generate outputs as described herein, including lazy learning applications of machine-learning algorithms as described in further detail below.

Still referring to FIG. 6, machine learning processes as described herein may be used to generate machine learning models 624. A "machine learning model" as used herein is a mathematical and/or algorithmic representation of a relationship between inputs and outputs, as generated using any machine learning process including without limitation any process as described above, and stored in memory. For instance, an input may be sent to machine learning model 624, which once created, may generate an output as a function of a relationship that was derived. For instance, and without limitation, a linear regression model, generated using a linear regression algorithm, may compute a linear combination of input data using coefficients derived during machine learning processes to calculate an output. As a further non-limiting example, machine learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes.

Still referring to FIG. 6, machine learning algorithms may include supervised machine learning process 628. A "supervised machine learning process" as used herein is one or more algorithms that receive labelled input data and generate outputs according to the labelled input data. For instance, supervised machine learning process 628 may include document data as described above as inputs, document types and/or categories as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine learning process 628 that may be used to determine relation between inputs and outputs. Supervised machine learning processes may include classification algorithms as defined above.

Further referring to FIG. 6, machine learning processes may include unsupervised machine learning processes 632. An "unsupervised machine learning process" as used herein is a process that calculates relationships in one or more datasets without labelled training data. Unsupervised machine learning process 632 may be free to discover any structure, relationship, and/or correlation provided in training data 604. Unsupervised machine learning process 632 may not require a response variable. Unsupervised machine learning process 632 may calculate patterns, inferences, correlations, and the like between two or more variables of training data 604. In some embodiments, unsupervised machine learning process 632 may determine a degree of correlation between two or more elements of training data 604.

Still referring to FIG. 6, machine learning module 600 may be designed and configured to create a machine learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, according to some embodiments. In some embodiments, machine learning model 624 may utilize one or more encoders and/or decoders, transformer architectures, attention mechanisms, self-attention mechanisms, multi-head attention, masked multi-head attention, token biasing, probability biasing, feed forward layers, positional encoding, recurrent decoders, or any other processes that may be implemented.

Continuing to refer to FIG. 6, machine learning algorithms may include, without limitation, linear discriminant analysis. Machine learning algorithm may include quadratic discriminate analysis. Machine learning algorithms may include kernel ridge regression. Machine learning algorithms may include support vector machines, including without limitation support vector classification-based regression processes. Machine learning algorithms may include stochastic gradient descent algorithms, including classification and regression algorithms based on stochastic gradient descent. Machine learning algorithms may include nearest neighbors algorithms. Machine learning algorithms may include various forms of latent space regularization such as variational regularization. Machine learning algorithms may include Gaussian processes, such as Gaussian Process Regression. Machine learning algorithms may include cross-decomposition algorithms, including partial least squares and/or canonical correlation analysis. Machine learning algorithms may include naive Bayes methods. Machine learning algorithms may include algorithms based on decision trees, such as decision tree classification or regression algorithms. Machine learning algorithms may include ensemble methods such as bagging meta-estimator, forest of randomized tress, AdaBoost, gradient tree boosting, and/or voting classifier methods. Machine learning algorithms may include neural net algorithms, including convolutional neural net processes.

Figure 7:
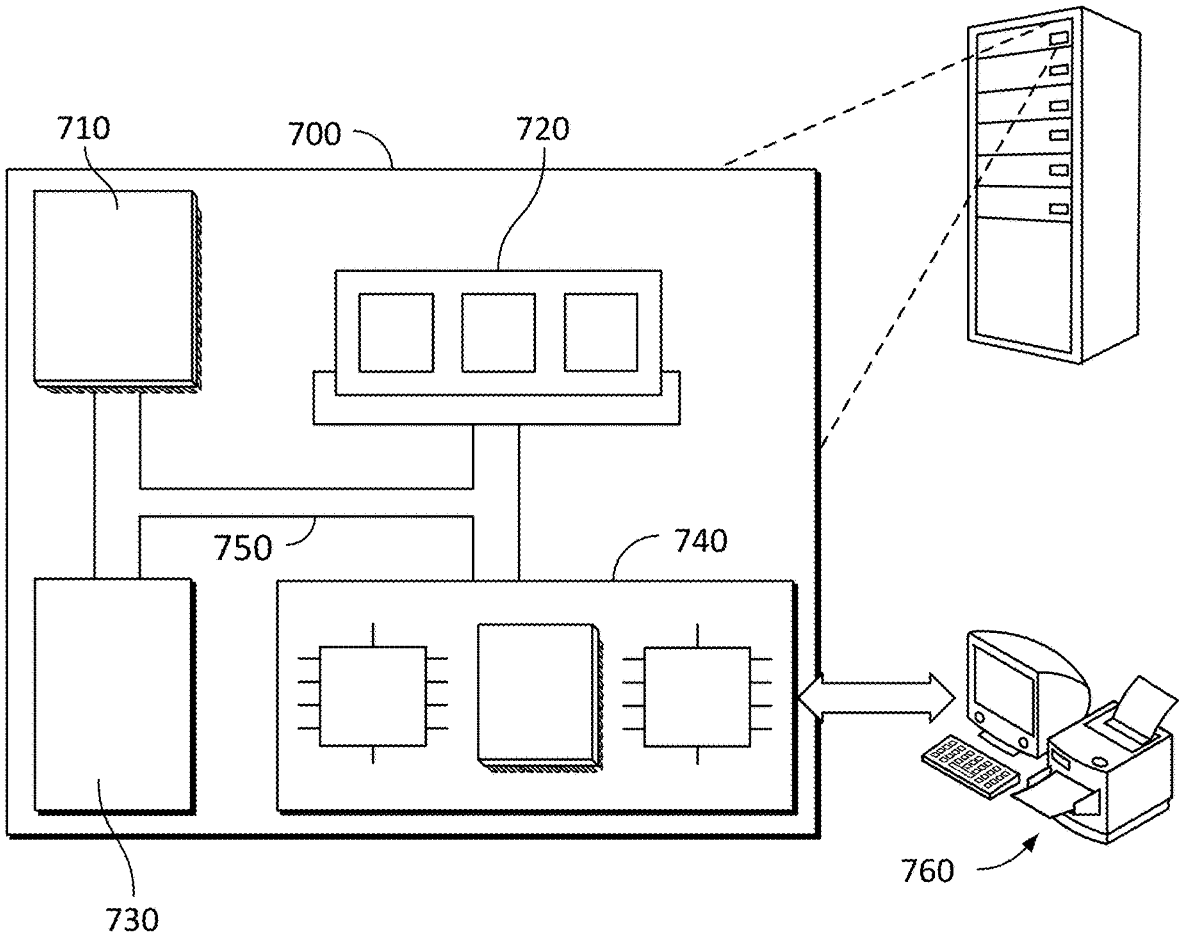
FIG. 7 illustrate a block diagram of a computing system.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. The apparatus may include disk storage and/or internal memory, each of which may be communicatively connected to each other. The apparatus 100 may include a processor 710. The processor 710 may enable both generic operating system (OS) functionality and/or application operations. In some embodiments, the processor 710 and the memory 720 may be communicatively connected. As used in this disclosure, "communicatively connected" means connected by way of a connection, attachment, or linkage between two or more elements which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device.

Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, the processor 710 may include any computing device as described in this disclosure, including without limitation a microcontroller, microprocessor, digital signal processor (DSP) and/or system on a chip (SoC) as described in this disclosure. The processor 710 may include, be included in, and/or communicate with a mobile device such as a mobile telephone or smartphone. The processor 710 may include a single computing device operating independently, or may include two or more computing device operating in concert, in parallel, sequentially or the like. Two or more computing devices may be included together in a single computing device or in two or more computing devices. The processor 710 may interface or communicate with one or more additional devices as described below in further detail via a network interface device. Network interface device may be utilized for connecting the processor 710 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

The processor 710 may include but is not limited to, for example, a computing device or cluster of computing devices in a first location and a second computing device or cluster of computing devices in a second location. The processor 710 may include one or more computing devices dedicated to data storage, security, distribution of traffic for load balancing, and the like. The processor 710 may distribute one or more computing tasks as described below across a plurality of computing devices of computing device, which may operate in parallel, in series, redundantly, or in any other manner used for distribution of tasks or memory between computing devices. The processor 710 may be implemented using a "shared nothing" architecture in which data is cached at the worker, in an embodiment, this may enable scalability of system 700 and/or processor 710.

With continued reference to FIG. 7, processor 710 and/or a computing device may be designed and/or configured by memory 720 to perform any method, method step, or sequence of method steps in any embodiment described in this disclosure, in any order and with any degree of repetition. For instance, the processor 710 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The processor 710 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. In some implementations, the processor 710 is a programmable (or reprogrammable) general purpose microprocessor or microcontroller. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more network interface devices, e.g., an Ethernet card, a serial communication device, e.g., an RS-232 port, and/or a wireless interface device, e.g., an 802.11 card, a 3G wireless modem, or a 4G/5G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. An artificial intelligence (AI) system for transforming document data into structured outputs, comprising:
- a computing device configured to:
- receive a document;
- extract document data from the document through a data extraction process;
- input the document data into an artificial intelligence, wherein the artificial intelligence is trained with training data correlating document data to categories;
- categorize the document data to a category through the artificial intelligence;
- process the document data through the artificial intelligence, wherein the artificial intelligence selectively processes the data based on the categorization; and
- generate a structured output of document data based on the processing through the artificial intelligence, wherein the structured output at least partially retains a structure of the document, wherein the artificial intelligence transforms the document data into a compact format for processing allowing for a reduced token limitation error rate of the artificial intelligence by at least 50%.

2. The system of claim 1, wherein the artificial intelligence processes the document data based on at least two simultaneously occurring categories of the document data.

3. The system of claim 1, wherein the computing device is further configured to validate the structured output through a validation process.

4. The system of claim 3, wherein the validation process comprises a rule-based policy.

5. The system of claim 4, wherein the computing devices is further configured to correct the structure output based on the validation process.

6. The system of claim 1, wherein the computing device is further configured to:
- identify a context of the document data through the artificial intelligence; and
- match the document data to an entity based on the identified context through the artificial intelligence.

7. The system of claim 1, wherein the computing device is further configured to:
- compare the document data to a data threshold; and
- upon the document data exceeding the data threshold, communicate the document data to the artificial intelligence.

8. The system of claim 1, wherein the categorization comprises a similarity-based binary classification.

9. An artificial intelligence-based computer-implemented method for transforming document data into structured outputs, comprising:
- receiving a document;
- extracting document data from the document through a data extraction process;
- inputting the document data into an artificial intelligence, wherein the artificial intelligence is trained with training data correlating document data to categories;
- categorizing the document data to a category through the artificial intelligence;
- processing the document data through the artificial intelligence, wherein the artificial intelligence selectively processes the data based on the categorization; and
- generating a structured output of document data based on the processing through the artificial intelligence, wherein the structured output at least partially retains a structure of the document, wherein the artificial intelligence transforms the document data into a compact format for processing allowing for a reduced token limitation error rate of the artificial intelligence by at least 50%.

10. The method of claim 9, further comprising processing the document data based on at least two simultaneously occurring categories of the document data.

11. The method of claim 9, further comprising validating the structured output through a validation process.

12. The method of claim 11, wherein the validation process comprises a rule-based policy.

13. The method of claim 12, further comprising correcting the structured output based on the validation process.

14. The method of claim 9, further comprising:
- identifying an a context of the document data through the artificial intelligence; and
- matching the document data to an entity based on the identified context through the artificial intelligence.

15. The method of claim 9, further comprising:
- comparing the document data to a data threshold; and
- upon the document data exceeding the data threshold, communicating the document data to the artificial intelligence.

16. The method of claim 9, further comprises processing the document data at a page level.

17. A non-transitory computer readable medium containing instructions, that, when executed by a processor, cause the processor to:
- receive a document;
- extract document data from the document through a data extraction process;
- input the document data into an artificial intelligence, wherein the artificial intelligence is trained with training data correlating document data to categories;
- categorize the document data to a category through the artificial intelligence;

process the document data through the artificial intelligence, wherein the artificial intelligence selectively processes the data based on the categorization; and generate a structured output of document data based on the processing through the artificial intelligence, wherein the structured output at least partially retains a structure of the document, wherein the artificial intelligence transforms the document data into a compact format for processing allowing for a reduced token limitation error rate of the artificial intelligence by at least 50%.

* * * * *